(12) United States Patent
Sato et al.

(10) Patent No.: US 9,340,217 B2
(45) Date of Patent: May 17, 2016

(54) RAILCAR BOGIE

(71) Applicants: KAWASAKI JUKOGYO KABUSHIKI KAISHA, Kobe-shi, Hyogo (JP); SUMITOMO ELECTRIC INDUSTRIES, LTD., Osaka-shi, Osaka (JP)

(72) Inventors: Yoshi Sato, Kobe (JP); Yukitaka Taga, Kobe (JP); Kazuo Isomura, Kobe (JP); Makoto Tamaki, Kobe (JP); Junichi Shirakawa, Kobe (JP); Koichi Murata, Kobe (JP); Hirokazu Haraguchi, Osaka (JP); Takayuki Sawa, Osaka (JP)

(73) Assignees: KAWASAKI JUKOGYO KABUSHIKI KAISHA, Kobe (JP); SUMITOMO ELECTRIC INDUSTRIES, LTD., Oaska (JP)

( * ) Notice: Subject to any disclaimer, the term of this patent is extended or adjusted under 35 U.S.C. 154(b) by 0 days.

(21) Appl. No.: 14/409,152

(22) PCT Filed: Jun. 10, 2013

(86) PCT No.: PCT/JP2013/003627
§ 371 (c)(1),
(2) Date: Dec. 18, 2014

(87) PCT Pub. No.: WO2013/190798
PCT Pub. Date: Dec. 27, 2013

(65) Prior Publication Data
US 2015/0175176 A1  Jun. 25, 2015

(30) Foreign Application Priority Data

Jun. 18, 2012  (JP) ................................. 2012-137260

(51) Int. Cl.
*B61F 5/10* (2006.01)
*B61F 5/22* (2006.01)
(Continued)

(52) U.S. Cl.
CPC ... *B61F 5/10* (2013.01); *B61F 5/22* (2013.01); *F16F 9/049* (2013.01); *F16F 9/05* (2013.01); *F16F 9/052* (2013.01); *F16F 9/58* (2013.01); *F16F 15/04* (2013.01)

(58) Field of Classification Search
CPC ........... F16F 9/057; F16F 9/049; F16F 9/052; F16F 9/58; F16F 9/05; F16F 5/10; F16F 13/002; F16F 13/26; F16F 13/264; F16F 13/106; F16F 13/268; F16F 15/04; B61F 5/08; B61F 5/10; B61F 5/14; B61F 5/22
See application file for complete search history.

(56) References Cited

U.S. PATENT DOCUMENTS 3,081,075 A * 3/1963 Selman ................. F16F 9/0445
105/198.1
3,826,507 A * 7/1974 Brand .................... B60G 11/28
105/198.1

(Continued)

FOREIGN PATENT DOCUMENTS

EP  0 972 963 A2  1/2000
EP  2 251 562 A1  11/2010
(Continued)

OTHER PUBLICATIONS

International Search Report issued in International Patent Application No. PCT/JP2013/003627 dated Aug. 20, 2013.
(Continued)

*Primary Examiner* — Jason C Smith
(74) *Attorney, Agent, or Firm* — Oliff PLC

(57) ABSTRACT

A railcar bogie includes: a bolster located under a carbody of a railcar; an air spring including an air spring main body in which air is stored, the air spring being arranged between the carbody and the bolster; a coil spring arranged between the air spring and the bolster and configured to separate the air spring from the bolster by restoring force thereof in a state where a height of the carbody is maintained at a certain height regardless of the air spring; and a limiting member configured to limit the amount of displacement of the coil spring to limit the amount of separation between the air spring and the bolster.

8 Claims, 8 Drawing Sheets

(51) Int. Cl.
*F16F 9/04* (2006.01)
*F16F 9/05* (2006.01)
*F16F 9/58* (2006.01)
*F16F 15/04* (2006.01)

(56) References Cited

U.S. PATENT DOCUMENTS

| | | | | |
|---|---|---|---|---|
| 3,904,181 | A * | 9/1975 | Harsy-Vadas | B60G 11/30 267/3 |
| 5,005,808 | A * | 4/1991 | Warmuth, II | F16F 9/0463 267/122 |
| 6,257,561 | B1 * | 7/2001 | Nakayama | F16F 9/05 267/122 |
| 6,361,028 | B1 * | 3/2002 | Hubbell | F16F 9/0409 267/64.19 |
| 8,220,785 | B2 * | 7/2012 | Bank | F16F 9/0463 267/64.27 |
| 9,162,687 | B2 * | 10/2015 | Bujeau | B61F 5/10 |
| 2006/0180048 | A1 * | 8/2006 | Teichman | B60G 11/27 105/198.1 |
| 2007/0137515 | A1 * | 6/2007 | Schneider | B61F 5/10 105/182.1 |
| 2011/0031662 | A1 * | 2/2011 | Toyama | B61F 5/02 267/121 |
| 2011/0233832 | A1 * | 9/2011 | Sawa | B61F 5/10 267/3 |
| 2012/0056362 | A1 | 3/2012 | Fujimoto | |
| 2012/0240817 | A1 * | 9/2012 | Bujeau | B29D 22/023 105/453 |
| 2013/0180427 | A1 * | 7/2013 | Shinmura | B61F 5/10 105/199.1 |
| 2013/0313764 | A1 * | 11/2013 | Fujimoto | B61F 5/02 267/64.27 |
| 2013/0319284 | A1 * | 12/2013 | Shinmura | B61C 17/00 105/453 |
| 2014/0020595 | A1 * | 1/2014 | Shinagawa | B61F 5/22 105/199.1 |
| 2014/0117597 | A1 * | 5/2014 | Fujimoto | B60G 11/62 267/35 |
| 2014/0175717 | A1 * | 6/2014 | Jackson, Jr. | B21D 53/88 267/64.27 |
| 2014/0191487 | A1 * | 7/2014 | Sachan | B60G 11/27 280/124.157 |
| 2014/0230687 | A1 * | 8/2014 | Jackson, Jr. | B61F 5/10 15/198.1 |
| 2014/0300038 | A1 * | 10/2014 | Kita | F16F 9/05 267/122 |
| 2015/0122145 | A1 * | 5/2015 | Jackson, Jr. | B61F 5/02 105/453 |
| 2015/0175176 | A1 * | 6/2015 | Sato | B61F 5/10 105/198.1 |

FOREIGN PATENT DOCUMENTS

| | | |
|---|---|---|
| JP | A-60-163759 | 8/1985 |
| JP | A-2002-347619 | 12/2002 |
| JP | A-2009-18758 | 1/2009 |
| JP | A-2010-76608 | 4/2010 |
| JP | 2011-020585 A | 2/2011 |
| JP | 2012-017768 A | 1/2012 |
| JP | 2012-017769 A | 1/2012 |
| WO | 2012/056863 A1 | 5/2012 |

OTHER PUBLICATIONS

Feb. 23, 2016 Search Report issued in European Application No. 13806111.4.

* cited by examiner

RAILCAR BOGIE

TECHNICAL FIELD

The present invention relates to a railcar bogie including an air spring.

BACKGROUND ART

Typically, a static wheel load of a railcar is adjusted by: securing a gap between a frame and an air spring; and inserting a spacer (liner) into the gap or taking out the inserted spacer (liner) from the gap. To secure the gap between the frame and the air spring, a lower surface of the air spring needs to be separated from an upper surface of the frame by pushing up the air spring. Here, various technologies for pushing up the air spring have been proposed (PTLs 1 and 2). For example, according to a conventional art described in PTL 1, a pivot shaft (downward support projection) provided at a lower portion of the air spring is being slidably inserted into a receiving portion formed on the frame, and an elastic member is being interposed between the frame and the air spring. To secure the gap between the frame and the air spring in this conventional art, first, in a state where a carbody is supported by a supporting unit, such as a hydraulic jack, so as not to move downward, internal pressure of the air spring is reduced by removing air from the air spring. With this, the lower portion of the air spring is pushed up by elastic force of the elastic member, so that the gap is secured between the frame and the air spring.

CITATION LIST

Patent Literature

PTL 1: Japanese Laid-Open Patent Application Publication No. 2010-76608
PTL 2: Japanese Laid-Open Patent Application Publication No. 2009-18758

SUMMARY OF INVENTION

Technical Problem

According to the conventional art described in PTL 1, the gap can be easily secured between the frame and the air spring, and the adjustment of the static wheel load can be efficiently performed. However, since frictional force is generated between an outer surface of the pivot shaft and an inner surface of the receiving portion, a push-up amount when the elastic member pushes up the air spring does not become stable, so that it is difficult to surely secure the gap having a necessary width.

To solve this problem, the inventors of the present application have studied the increase in the elastic force of the elastic member. As a result of the diligent studies, the present inventors have obtained findings that if the elastic force is just increased, the push-up amount (the amount of displacement of the elastic member) increases, and the pivot shaft is highly possibly separated from the receiving portion. If the pivot shaft is separated from the receiving portion, the positioning of the pivot shaft with respect to the receiving portion needs to be performed to insert the pivot shaft into the receiving portion again, and this deteriorates the working property. In a case where an O ring is being attached to an outer peripheral surface of the pivot shaft (see PTL 2), excessive force is applied to the O ring when the pivot shaft is separated from the receiving portion or the pivot shaft is inserted into the receiving portion. Thus, the O ring is damaged. In addition, the function of the air spring may be lost when the air spring is separated from the receiving portion.

The present invention was made under the above circumstances, and an object of the present invention is to provide a railcar bogie by which a desired push-up amount of an air spring can be obtained.

Solution to Problem

In order to solve the above problems, a railcar bogie according to the present invention includes: a frame located under a carbody of a railcar; an air spring arranged between the carbody and the frame; an elastic member arranged between the air spring and the frame and configured to separate the air spring from the frame by restoring force thereof in a state where a height of the carbody is maintained at a certain height regardless of the air spring; and a limiting member configured to limit an amount of displacement of the elastic member to limit an amount of separation between the air spring and the frame.

According to this configuration, the amount of separation between the air spring and the frame is limited by limiting by the limiting member the amount of displacement of the elastic member when the elastic member is restored. Therefore, a desired push-up amount of the air spring can be obtained.

Advantageous Effects of Invention

According to the present invention, by the above configuration, the desired push-up amount of the air spring can be obtained, and a desired gap between the frame and the air spring can be surely obtained.

DESCRIPTION OF EMBODIMENTS

Hereinafter, preferred embodiments of a railcar bogie according to the present invention will be explained in reference to the drawings.

Figure 1:
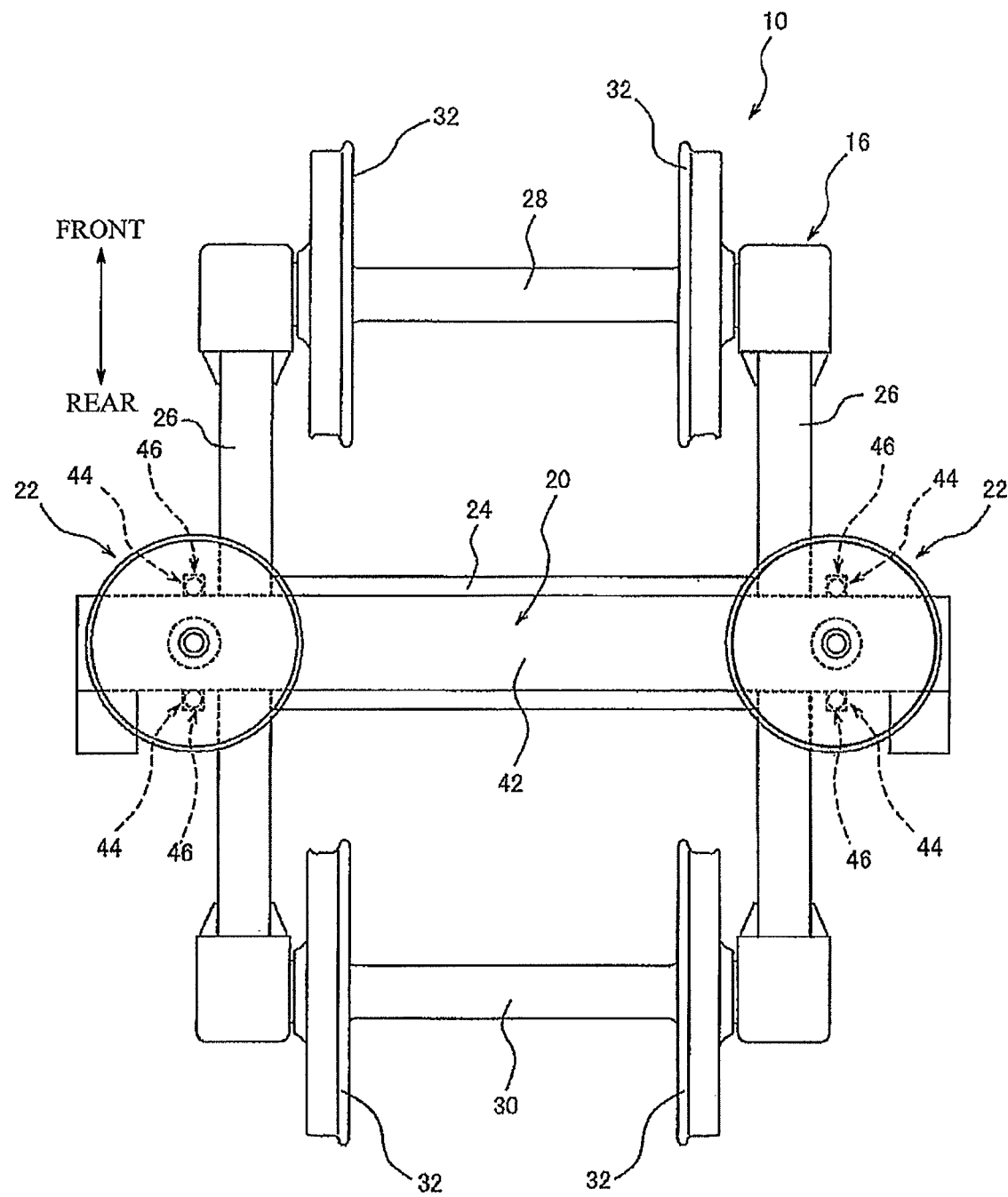
FIG. 1 is a plan view showing the configuration of a railcar bogie according to an embodiment.
Figure 2:
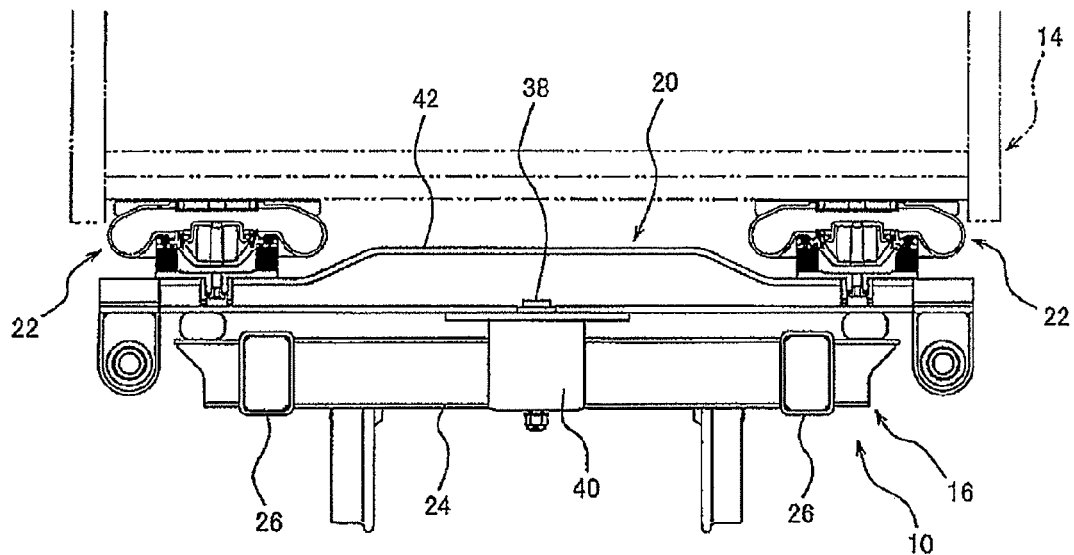
FIG. 2 is a front view showing the configuration of the railcar bogie according to the embodiment.
Figure 3:
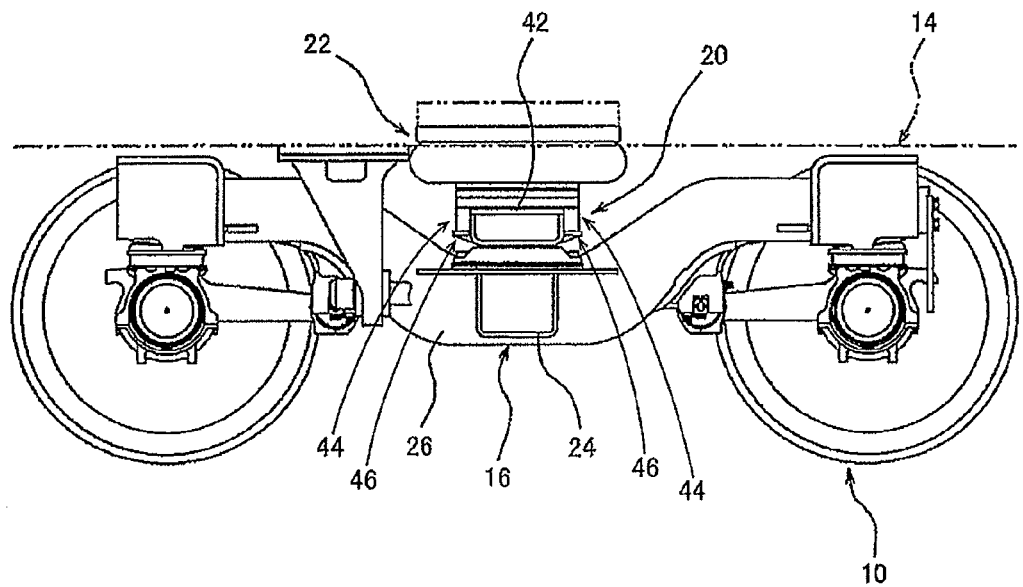
FIG. 3 is a left side view showing the configuration of the railcar bogie according to the embodiment.

As shown in FIGS. 1 to 3, a railcar bogie 10 of the present embodiment includes: a bogie frame 16; a bolster 20 as a "frame" attached to the bogie frame 16; and two air springs 22.

As shown in FIGS. 1 to 3, the bogie frame 16 includes: a cross beam 24 extending in a railcar width direction; and a pair of left and right side sills 26 respectively extending in a front-rear direction from both railcar width direction end portions of the cross beam 24. As shown in FIG. 1, a front axle 28 is provided between the two side sills 26 in front of the cross beam 24. A rear axle 30 is provided between the two side sills 26 behind the cross beam 24. Wheels 32 are respectively fixed to both railcar width direction sides of the front and rear axles 28 and 30. Further, as shown in FIG. 2, a center pin receiving portion 40 that supports a center pin 38 is provided at a railcar width direction middle portion of the cross beam 24.

As shown in FIGS. 1 to 3, the bolster 20 is located above the bogie frame 16 to receive a load of a carbody 14 (FIGS. 2 and 3) via the two air springs 22. The bolster 20 includes: a hollow frame main body 42 extending in the railcar width direction; and seat portions 46 (FIGS. 1 and 3) to which below-described spring devices 44 (FIG. 6) are respectively attached. As shown in FIGS. 1 and 3, the seat portions 46 are formed to extend from the frame main body 42 in a horizontal direction and a direction (front-rear direction) perpendicular to a longitudinal direction of the bolster 20.

Figure 4:
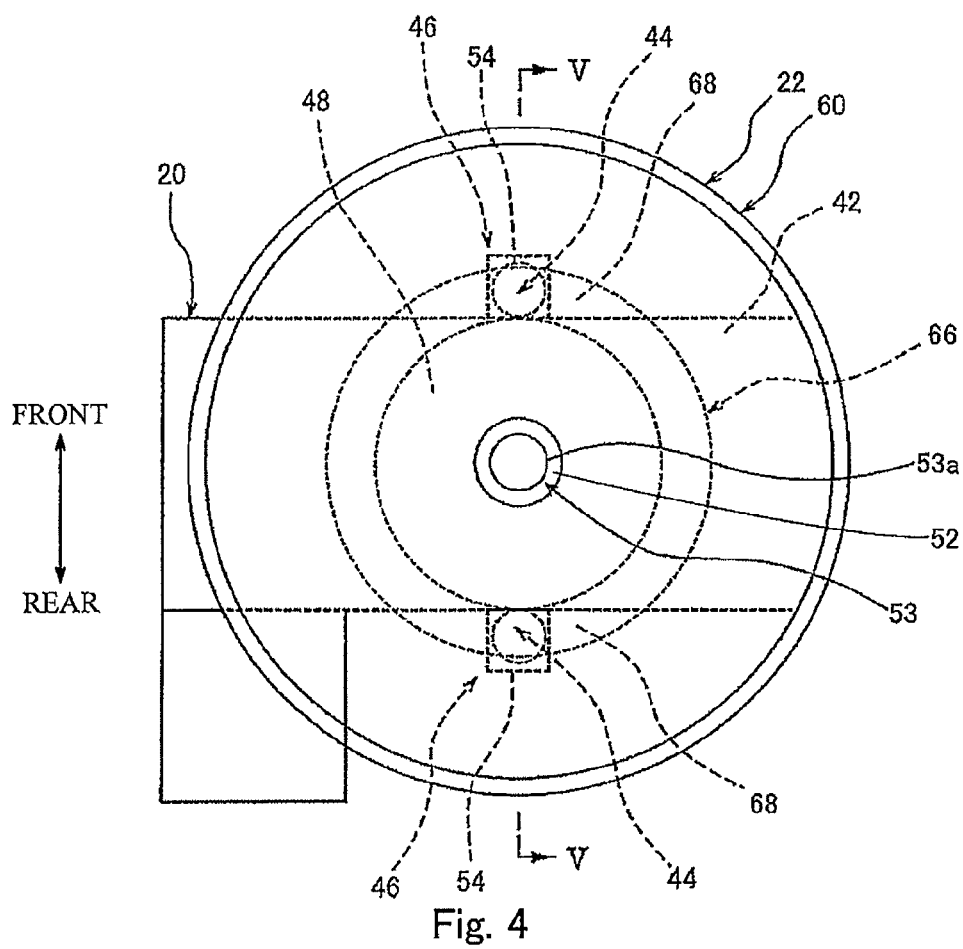
FIG. 4 is a plan view showing the configuration of major components of the railcar bogie according to the embodiment.
Figure 5:
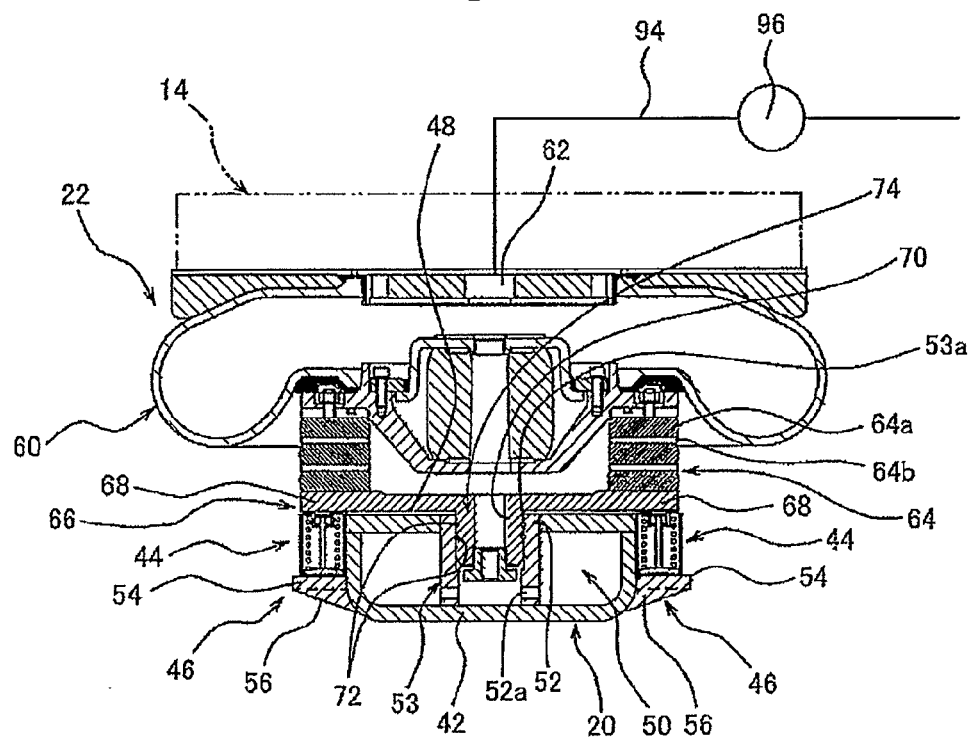
FIG. 5 is a cross-sectional view taken along line V-V of FIG. 4 and shows the configurations of the major components of the railcar bogie according to the embodiment.

As shown in FIG. 5, the frame main body 42 has a substantially quadrangular cross section. As shown in FIG. 2, the center pin 38 is provided at a railcar width direction middle portion of the frame main body 42. As shown in FIG. 4, substantially disc-shaped air spring receiving portions 48 that respectively receive lower surfaces of the air springs 22 are respectively formed on upper surfaces of both railcar width direction end portions (FIG. 4 shows a left end portion) of the frame main body 42.

As shown in FIG. 5, an auxiliary air chamber 50 in which the air supplied from the air spring 22 is stored and a first connection portion 52 in which a second connection portion 70 of the air spring 22 is fitted so as to be slidable in an upper-lower direction are formed in each of both railcar width direction end portions of the frame main body 42. The first connection portion 52 is formed in a tubular shape extending in the upper-lower direction and having a substantially circular cross section. An internal space of the first connection portion 52 communicates with the auxiliary air chamber 50 through an opening 52a formed on a peripheral wall portion of the first connection portion 52, so that the air can move between the internal space of the first connection portion 52 and the auxiliary air chamber 50. To be specific, the first connection portion 52 of the present embodiment is constituted by a tubular communication portion 53 that communicates with the auxiliary air chamber 50. An inlet 53a of the communication portion 53 that receives the second connection portion 70 is open at a center portion of the air spring receiving portion 48.

As shown in FIGS. 4 and 5, each of the seat portions 46 includes a substantially plate-shaped seat portion main body 54 formed to extend from the frame main body 42 in the horizontal direction and the front-rear direction. As shown in FIG. 4, the seat portion main body 54 is formed in a substantially quadrangular shape in a plan view. As shown in FIG. 5, reinforcing ribs 56 are respectively joined to lower surfaces of the seat portion main bodies 54 by, for example, welding. Each of the reinforcing ribs 56 is formed in a substantially triangular shape in a side view. One side of the seat portion main body 54 and one side of the reinforcing rib 56 are joined to a side surface of the frame main body 42 by, for example, welding. The spring device 44 is arranged between the seat portion 46 and a below-described projecting portion 68. Therefore, to secure a space in which spring device 44 is arranged, the seat portion main body 54 is joined to a lower portion of the frame main body 42. The shape of the seat portion main body 54 is not especially limited and may be a substantially circular shape or a substantially semicircular shape in a plan view. The seat portions 46 and the frame main body 42 may be formed integrally.

As shown in FIG. 5, the air spring 22 includes: an air spring main body 60 in which the air is stored and which allows the movement of the air between the air spring main body 60 and the auxiliary air chamber 50; a supporting portion 66 configured to support the air spring main body 60; and the second connection portion 70 provided on the lower surface of the air spring 22 and fitted in the first connection portion 52 from above.

As shown in FIG. 4, the air spring main body 60 is made of an elastic material, such as rubber, and formed in a substantially circular shape in a plan view. As shown in FIG. 5, an air supply and exhaust opening 62 through which the air is supplied to the air spring main body 60 or discharged from the air spring main body 60 is formed on a middle portion of an upper portion of the air spring main body 60. A substantially cylindrical stack body 64 including an elastic body 64a and a metal plate 64b is provided at a lower portion of the air spring main body 60.

Figure 8:
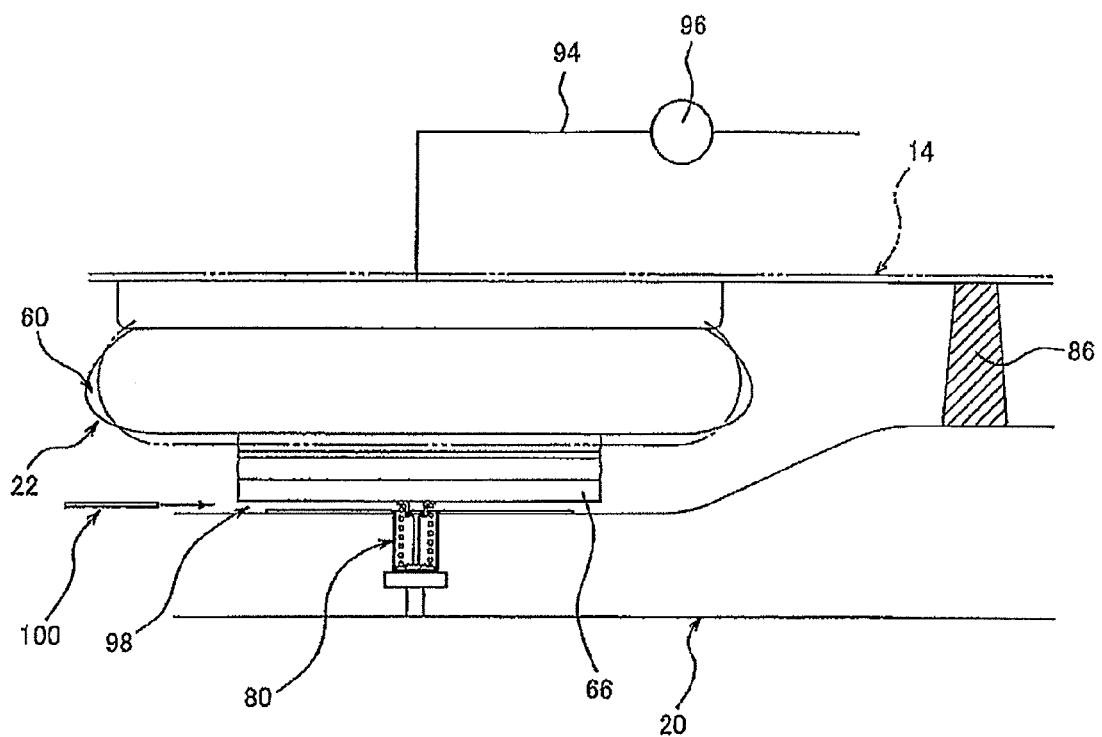
FIG. 8 is a front view showing a state where the air spring is being pushed up by the coil spring (elastic member) in the wheel load adjustment.

As shown in FIG. 5, the supporting portion 66 is a substantially plate-shaped member and formed in a substantially circular shape (FIG. 4) in a plan view. The supporting portion 66 is provided on a lower surface of the stack body 64 to be arranged between the air spring main body 60 and the bolster 20. As shown in FIG. 4, the supporting portion 66 includes two projecting portions 68 projecting from the frame main body 42 in the front-rear direction in a plan view. The projecting portions 68 are respectively provided at both radial sides of the center of the air spring main body 60 to sandwich the center of the air spring main body 60. A lower surface of each of the projecting portions 68 is opposed to an upper surface of the corresponding seat portion main body 54. As shown in FIG. 8, the supporting portion 66 receives elastic force of a coil spring 80 to be separated from the bolster 20 and push up the air spring main body 60.

As shown in FIG. 5, the second connection portion 70 is provided so as to project downward from a center portion of the supporting portion 66. The second connection portion 70 is formed in a tubular shape extending in the upper-lower direction and having a substantially circular cross section. An internal space of the second connection portion 70 communicates with the inside of the air spring main body 60, so that the air can move between the internal space of the second connection portion 70 and the inside of the air spring main body 60. To be specific, the second connection portion 70 of the present embodiment is constituted by a communication pipe 74 that communicates with the air spring main body 60. Two O rings 72 as "sealing members" are attached to an outer peripheral surface of the second connection portion 70 so as to be spaced apart from each other in the upper-lower direction. The second connection portion 70 is fitted in the first connection portion 52 so as to be slidable in the upper-lower direction. In the present embodiment, the second connection portion 70 is being inserted into the first connection portion 52 from above. By inserting the second connection portion 70 into the first connection portion 52, the auxiliary air chamber 50 and the air spring main body 60 communicate with each other through the communication portion 53 and the communication pipe 74. With this, the movement of the air is allowed between the auxiliary air chamber 50 and the air spring main body 60. In a case where the air spring 22 and the bolster 20 are separated from each other, the two O rings 72 are interposed between the second connection portion 70 (communication pipe 74) and the first connection portion 52 (communication portion 53) that fit each other.

Figure 6:
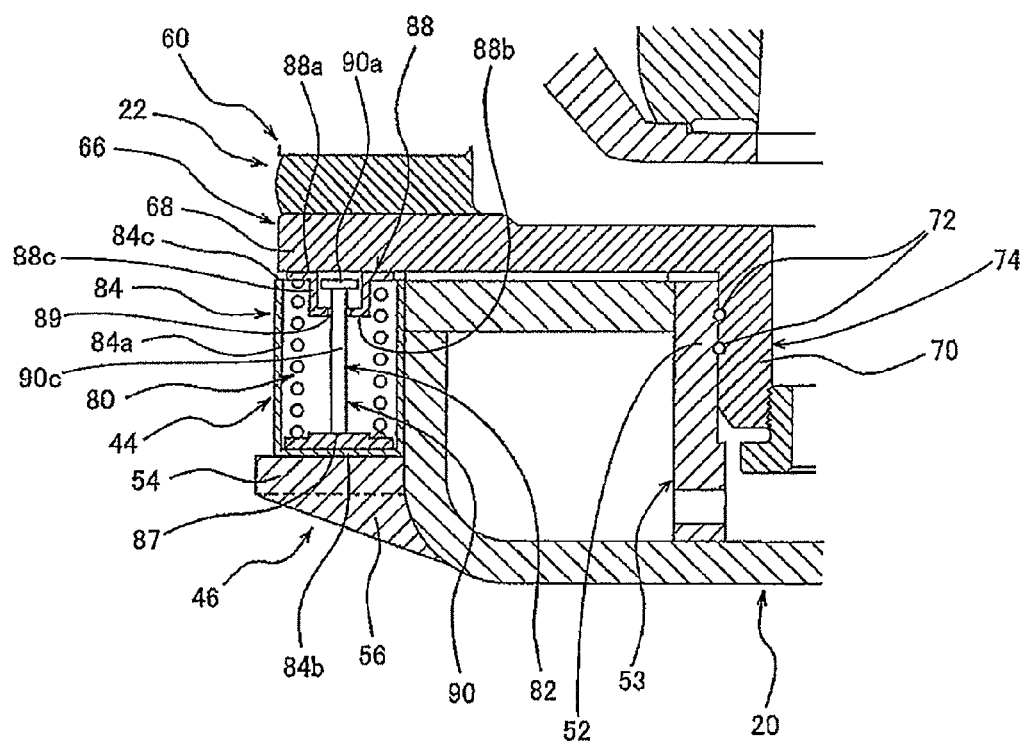
FIG. 6 is a partial cross-sectional view showing the configurations of a coil spring (elastic member) and a limiting member.

As shown in FIG. 6, each of the spring devices 44 includes: the coil spring 80 as an "elastic member" configured to expand and contract in the upper-lower direction; a limiting member 82 configured to limit the amount of displacement of the coil spring 80; and an accommodating portion 84 configured to accommodate the coil spring 80 and the limiting member 82.

As shown in FIG. 6, the accommodating portion 84 includes a substantially cylindrical peripheral wall portion 84a and a bottom portion 84b provided at a lower portion of the peripheral wall portion 84a. An opening portion 84c is formed at an upper end portion of the peripheral wall portion 84a. An inner diameter of the accommodating portion 84 is larger than an outer diameter of the coil spring 80. In a state where the lower surface of the air spring 22 contacts an upper surface of the bolster 20, a length of the accommodating portion 84 in the upper-lower direction is shorter than an interval between the seat portion main body 54 and the projecting portion 68. The bottom portion 84b is joined to the seat portion main body 54 by, for example, welding. A method of joining the accommodating portion 84 to the seat portion main body 54 is not especially limited, and joining members, such as a bolt and a nut, may be used.

As shown in FIG. 6, the coil spring 80 receives the load of the carbody 14 (FIG. 5) via the air spring 22 to elastically deform (in the present embodiment, compress). When the load is reduced, the coil spring 80 pushes up the air spring 22 by its elastic force (that is, its restoring force). The coil spring 80 is formed such that an axis thereof extends in the upper-lower direction. The coil spring 80 is accommodated in the accommodating portion 84 to be arranged between the air spring 22 and the bolster 20. One (that is, a lower end portion) of end portions of the coil spring 80 is attached to the seat portion main body 54 via a fixed member 87 of the below-described limiting member 82 and the bottom portion 84b of the accommodating portion 84. The other end portion (that is, an upper end portion) of the coil spring 80 is attached to the projecting portion 68 of the supporting portion 66 via a movable member 88 of the below-described limiting member 82. To be specific, the one end portion of the coil spring 80 is attached to the seat portion main body 54 of the seat portions 46, and the other end portion of the coil spring 80 is attached to the projecting portion 68 of the supporting portion 66. The term "attached" used herein to specify the present invention is a concept including a state where a component is indirectly attached to another component via yet another component.

As shown in FIG. 8, in a state where the carbody 14 is supported by a carbody supporting portion 86, a height of the carbody 14 is maintained at a certain height. In this state, the load of the carbody 14 applied to the coil spring 80 is reduced, so that the coil spring 80 pushes up the air spring 22 by its elastic force (that is, its restoring force). To be specific, in a state where the height of the carbody 14 is maintained at a certain height regardless of the air spring 22, that is, in a state where the carbody 14 is supported at a certain height regardless of the air spring 22, the coil spring 80 separates the air spring 22 from the bolster 20.

As shown in FIG. 6, the limiting member 82 is attached to one end portion and the other end portion of the coil spring 80 regarding a displacement direction of the coil spring 80 and limits the amount of displacement of the coil spring 80 when the coil spring 80 is restored. Thus, the amount of separation between the air spring 22 and the bolster 20 is limited. The limiting member 82 includes: the fixed member 87 as a "first restricting member"; the movable member 88 as a "second restricting member"; and a stopper member 90 extending in the displacement direction of the coil spring 80. The fixed member 87 is mounted on the bottom portion 84b of the accommodating portion 84 to be attached to the lower end portion of the coil spring 80.

As shown in FIG. 6, the movable member 88 is a member that is attached to the upper end portion of the coil spring 80 and moves in an axial direction by the elastic deformation of the coil spring 80. The movable member 88 includes: a first engaging portion 88a that engages with the upper end portion of the coil spring 80; a second engaging portion 88b that is arranged under the first engaging portion 88a and engages with an the engaging portion 90a of the below-described stopper member 90 from below; and a coupling member 88c that couples the first engaging portion 88a to the second engaging portion 88b. An opening 89 is formed on the second engaging portion 88b. The stopper member 90 includes: a rod-shaped leg portion 90c having a lower end portion (that is, one end portion) fixed to the fixed member 87 that serves as the "first restricting member"; and an engaging portion 90a formed at an upper end portion (that is, the other end portion) of the leg portion 90c. The leg portion 90c is inserted through the opening 89 of the second engaging portion 88b. The engaging portion 90a engages with the second engaging portion 88b from above to stop the movable member 88 that serves as the "second restricting member".

Figure 9:
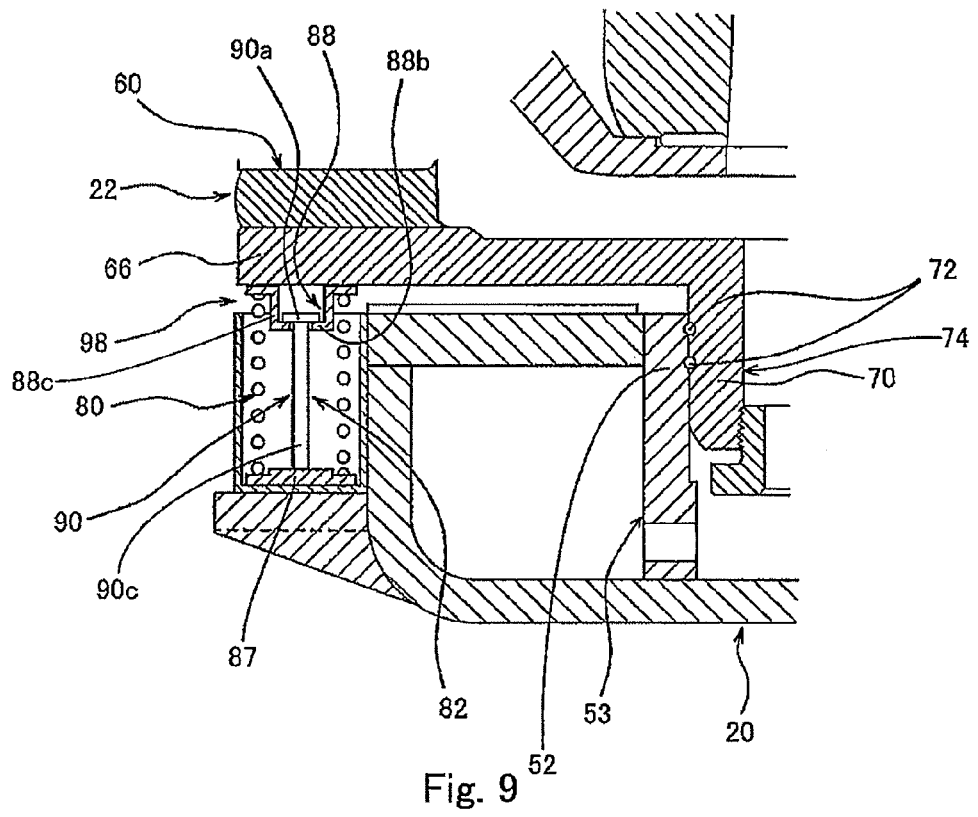
FIG. 9 is a partial cross-sectional view showing a state where the air spring is being pushed up by the coil spring (elastic member) in the wheel load adjustment.

As shown in FIG. 9, when the air spring 22 and the bolster 20 are separated from each other, the limiting member 82 limits the amount of separation between the air spring 22 and the bolster 20 to such a range that the fit state between the first connection portion 52 and the second connection portion 70 is maintained. The amount of separation can be changed by changing the length of the coupling member 88c of the movable member 88 and the length of the leg portion 90c of the stopper member 90.

As shown in FIG. 5, the carbody 14 is provided with an air tank (not shown), and the air tank and the air supply and exhaust opening 62 of the air spring 22 communicate with each other through an air supply pipe 94. An air supply and exhaust valve 96 is disposed on the air supply pipe 94 and can switch between an air supply state where the air is supplied from the air tank to the air spring 22 and an air exhaust state where the air in the air spring 22 is discharged. In the air exhaust state, the flow of the air from the air tank to the air spring 22 is blocked.

As shown in FIG. 8, the static wheel load of the railcar is adjusted by: securing a gap 98 between the bolster 20 and the air spring 22; and inserting a spacer 100 into the gap 98 or taking out the inserted spacer 100 from the gap 98. In FIG. 8, a direction in which the spacer 100 is inserted is shown by an arrow.

Figure 7:
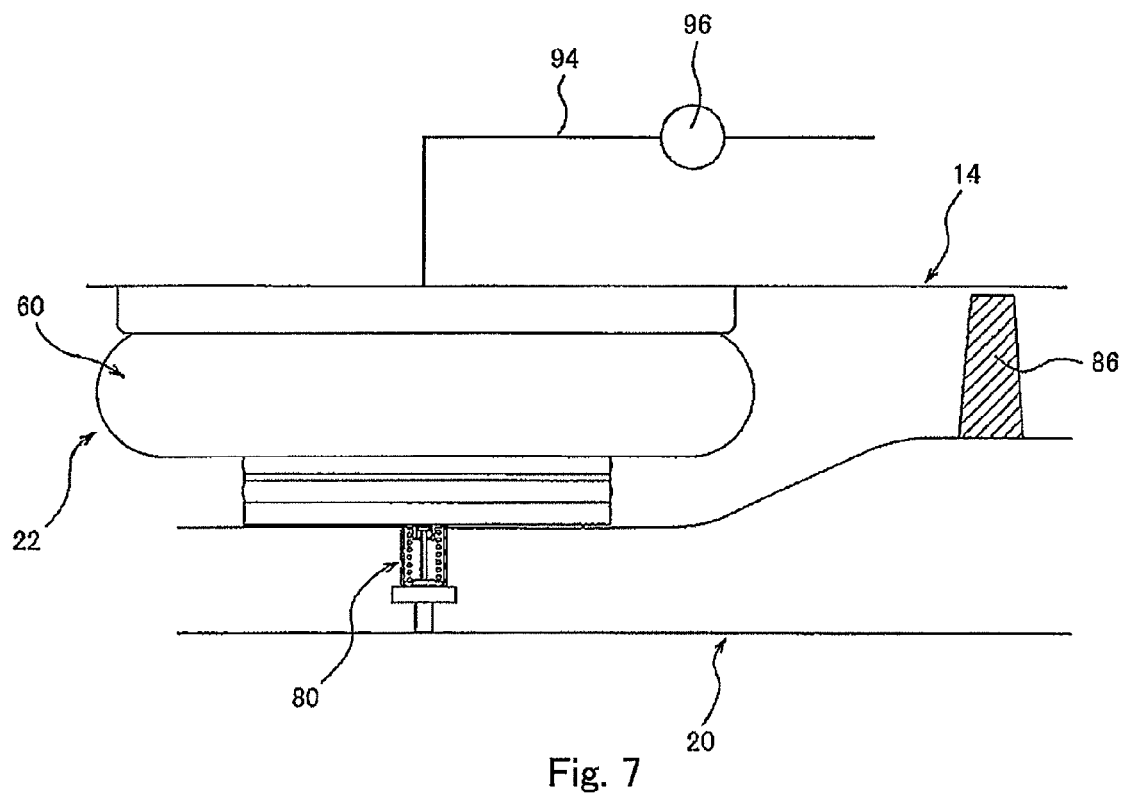
FIG. 7 is a front view showing a state where a carbody supporting portion is arranged between a bolster (frame) and a carbody in wheel load adjustment.

As shown in FIG. 7, when adjusting the static wheel load of the railcar, first, the carbody supporting portion 86 is arranged between the bolster 20 and the carbody 14. The carbody supporting portion 86 is a member that supports the load of the carbody 14. In the present embodiment, the carbody supporting portion 86 is formed in a block shape. A length (that is, a height) of the carbody supporting portion 86 in the upper-lower direction is shorter than an interval between the bolster 20 and the carbody 14 in a state where the air spring 22 and the bolster 20 are not separated from each other, and the air in the air spring 22 is not being discharged. The carbody supporting portion 86 may be any member as long as it can support the load of the carbody 14. The structure of the carbody supporting portion 86 is not especially limited. Instead of the carbody supporting portion 86 having a block shape, a mechanical jack, a hydraulic jack, or the like may be used. The position of the carbody supporting portion 86 is not limited to the position between the bolster 20 and the carbody 14. For example, the carbody supporting portion 86 may be arranged between the ground and the carbody 14.

After the carbody supporting portion 86 is arranged, the air in the air spring 22 is discharged by the air supply and exhaust valve 96 as shown in FIG. 8, so that the volume of the air spring 22 decreases. Thus, the carbody 14 supported by the air spring 22 moves down to such a height as to contact an upper surface of the carbody supporting portion 86. Then, the height of the carbody 14 is maintained at a certain height. In this state, since the carbody 14 is supported by the carbody supporting portion 86, the load of the carbody 14 applied to the coil spring 80 is reduced. Therefore, the coil spring 80 pushes up the air spring 22 by its elastic force (that is, its restoring force) to be restored.

As shown in FIG. 9, when the coil spring 80 is restored, the upper end portion of the coil spring 80 moves up. In accordance with this movement, the movable member 88 that engages with the upper end portion of the coil spring 80 moves up. When the movable member 88 reaches a predetermined height, the engaging portion 90a of the stopper member 90 stops the second engaging portion 88b of the movable member 88. Therefore, the upward movement of the upper end portion of the coil spring 80 is limited. To be specific, the amount of displacement of the coil spring 80 is limited. With this, the gap 98 having a width (upper-lower direction width) appropriate for inserting the spacer 100 (FIG. 8) between the air spring 22 and the bolster 20 is secured. Then, the spacer 100 is inserted into the gap 98. The width of the gap 98 is determined within such a range that the fit state between the first connection portion 52 and the second connection portion 70 is maintained.

Figure 10:
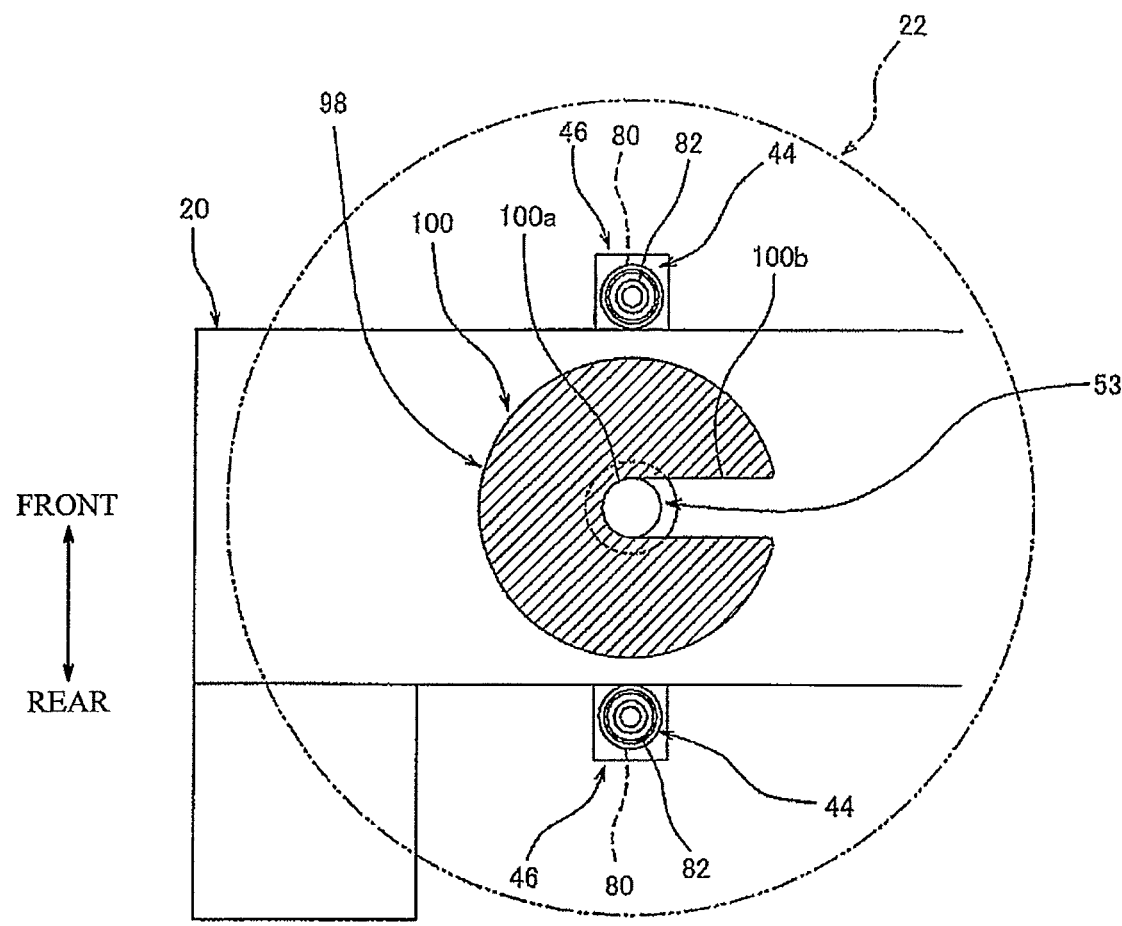
FIG. 10 is a plan view showing a state where a spacer is being inserted into a gap between the air spring and the bolster (frame).

As shown in FIG. 10, the spacer 100 is a member made of, for example, metal and having a predetermined thickness. A through portion 100a through which the second connection portion 70 (FIG. 5) is inserted is formed at a center portion of the spacer 100. A passage 100b is formed in a region spreading from the center portion of the spacer 100 to a part of a peripheral portion of the spacer 100, and the second connection portion 70 (FIG. 5) passes through the passage 100b from the peripheral portion of the spacer 100 toward the center portion of the spacer 100. The diameter of the spacer 100 is not especially limited. In the present embodiment, the diameter of the spacer 100 is equal to or smaller than the diameter of a lower surface of the supporting portion 66 (FIG. 5). The entire shape of the spacer 100 is a substantially U shape in a plan view.

After the spacer 100 (FIG. 10) is attached, the air is supplied to the air spring 22 by the air supply and exhaust valve 96 (FIG. 7), so that the volume of the air spring 22 expands. With this, the carbody 14 is pushed up by the air spring 22 to be separated from the carbody supporting portion 86 (FIG. 7). Then, the carbody supporting portion 86 is detached. Since the volume of the air spring 22 expands, and the load of the carbody 14 applied to the coil spring 80 increases, the coil spring 80 is compressed.

The present embodiment can obtain the following effects by the above configuration. To be specific, as shown in FIG. 9, in a case where the coil spring 80 pushes up the air spring 22, the limiting member 82 limits the amount of displacement of the coil spring 80 when the elastically deformed coil spring 80 is restored. With this, the limiting member 82 limits the amount of separation between the air spring 22 and the bolster 20 to such a range that the fit state between the first connection portion 52 and the second connection portion 70 is maintained. Therefore, even in a case where the elastic force of the coil spring 80 is increased, the first connection portion 52 is not separated from the second connection portion 70. Thus, push-up force for pushing up the air spring 22 is adequately secured, so that a desired push-up amount can be obtained. In addition, since the fit state between the first connection portion 52 and the second connection portion 70 can be maintained, the positioning error of the air spring 22 with respect to the bolster 20 in a direction (that is, the horizontal direction) perpendicular to the upper-lower direction can be prevented.

As shown in FIG. 9, in a case where the air spring 22 and the bolster 20 are separated from each other, the O rings 72 are interposed between the second connection portion 70 (communication pipe 74) and the first connection portion 52 (communication portion 53), which fit each other. Therefore, the air leakage from therebetween can be prevented.

As shown in FIG. 6, since the seat portion 46 is formed to extend from the frame main body 42 in the horizontal direction, the seat portion 46 can be easily provided at the side surface of the frame main body 42, and the spring device 44 can be easily attached to the seat portion 46.

As shown in FIG. 5, in the above-described embodiment, the bolster 20 as the "frame" includes the seat portions 46. However, in the case of a bolsterless bogie, the bogie frame as the "frame" may include the seat portions (not shown). In the above embodiment, the air spring main body 60 and the supporting portion 66 are integrally formed in the air spring 22. However, the air spring main body 60 and the supporting portion 66 may be formed separately. Each of the number of projecting portions 68 and the number of seat portions 46 is not limited to two and may be one or three or more. Instead of the coil spring 80, a plate spring or the like may be used as the "elastic member".

As shown in FIG. 6, in the above embodiment, the lower end portion of the leg portion 90c is fixed to the fixed member 87 in the stopper member 90 of the limiting member 82. However, the lower end portion of the leg portion 90c may be fixed to the seat portion 46. In this case, the fixed member 87 is omitted, and the seat portion 46 may serve as the "first restricting member" of the limiting member 82.

Figure 11:
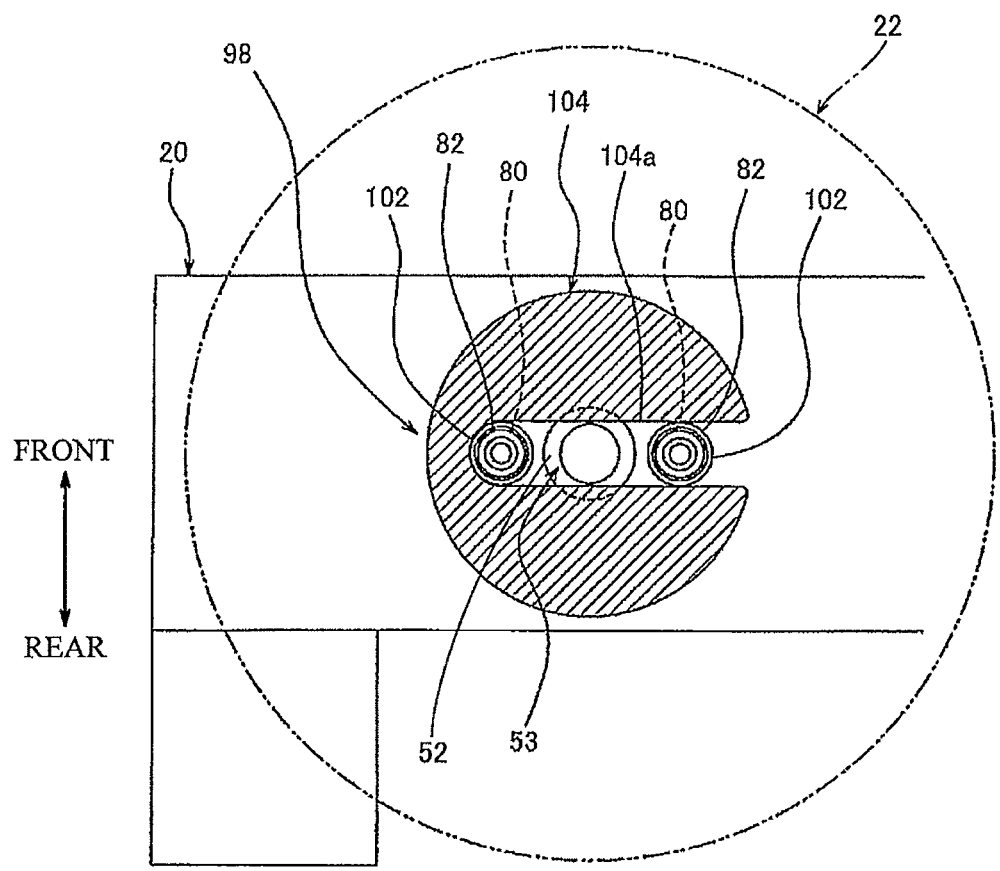
FIG. 11 is a plan view showing Modification Example regarding how to attach the elastic member and the limiting member.

FIG. 11 is a plan view showing Modification Example regarding how to attach the coil springs 80 (elastic member) and the limiting members 82. In the above embodiment shown in FIG. 10, the coil spring 80 and the limiting member 82 are attached to the seat portion 46. However, in Modification Example shown in FIG. 11, the coil springs 80 and the limiting members 82 are attached to the inside of the bolster 20 (frame). In Modification Example, the bolster 20 includes two non-through holes 102 that are located under the supporting portion 66 (FIG. 5) and open on the upper surface of the bolster 20. The coil spring 80 and the limiting member 82 are arranged in each of the non-through holes 102. The two non-through holes 102 are formed at both railcar width direction sides of the first connection portion 52. To be specific, the two non-through holes 102 and the first connection portion 52 are arranged so as to be line up in the railcar width direction in a plan view.

As shown in FIG. 11, when adjusting the wheel load, a spacer 104 including one passage 104a through which the second connection portion 70 (FIG. 5) and the two coil springs 80 pass is inserted from the railcar width direction into the gap 98 between the bolster 20 and the air spring 22. In Modification Example, the supporting portion 66 (FIG. 5) does not have to project from the upper surface of the bolster 20. Therefore, the air springs 22 can be arranged on the upper surface of the bolster 20 such that a positional relation therebetween is arbitrary. In addition, Modification Example is applicable to a case where the diameter of the supporting portion 66 (FIG. 5) is smaller than a front-rear direction length (width) of the bolster 20.

In Modification Example described above, the bolster 20 as the "frame" includes the non-through holes 102. However, in the case of the bolsterless bogie, the bogie frame as the "frame" may include the non-through holes 102. The number of non-through holes is not limited to two and may be one or three or more.

Further, the two non-through holes 102 may be respectively arranged at both front-rear direction sides of the first connection portion 52. In this case, in order that the spacer (not shown) can be inserted from the railcar width direction, the spacer may include: one passage which extends in the railcar width direction and through which the second connection portion 70 (FIG. 5) passes; and two passages which extend in the railcar width direction and through which the two coil springs 80 (FIG. 5) respectively pass.

Then, in the stopper member 90 of the limiting member 82, the lower end portion of the leg portion 90c may be fixed to the bolster 20 that serves as the "frame". In this case, the bolster 20 may serve as the "first restricting member" of the limiting member 82. In a case where the railcar bogie 10 is a bolsterless bogie, the lower end portion of the leg portion 90c may be fixed to the bogie frame that serves as the "frame". In this case, the bogie frame may serve as the "first restricting member" of the limiting member 82.

Figure 12:
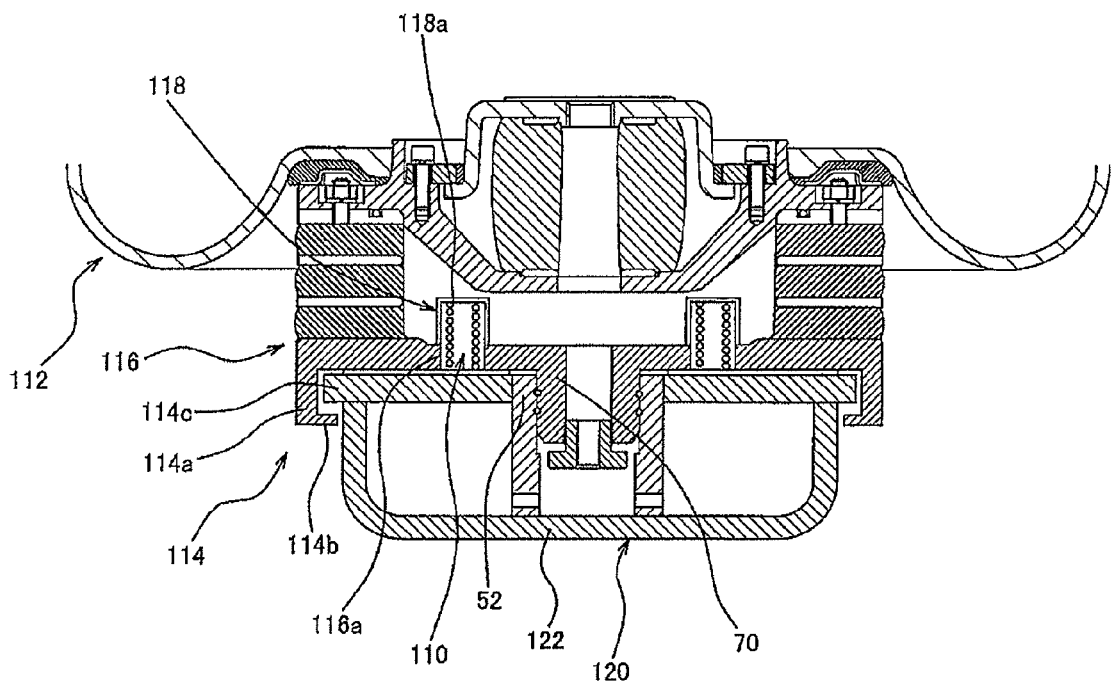
FIG. 12 is a cross-sectional view showing the configurations of the major components of the railcar bogie according to the other embodiment.
Figure 13:
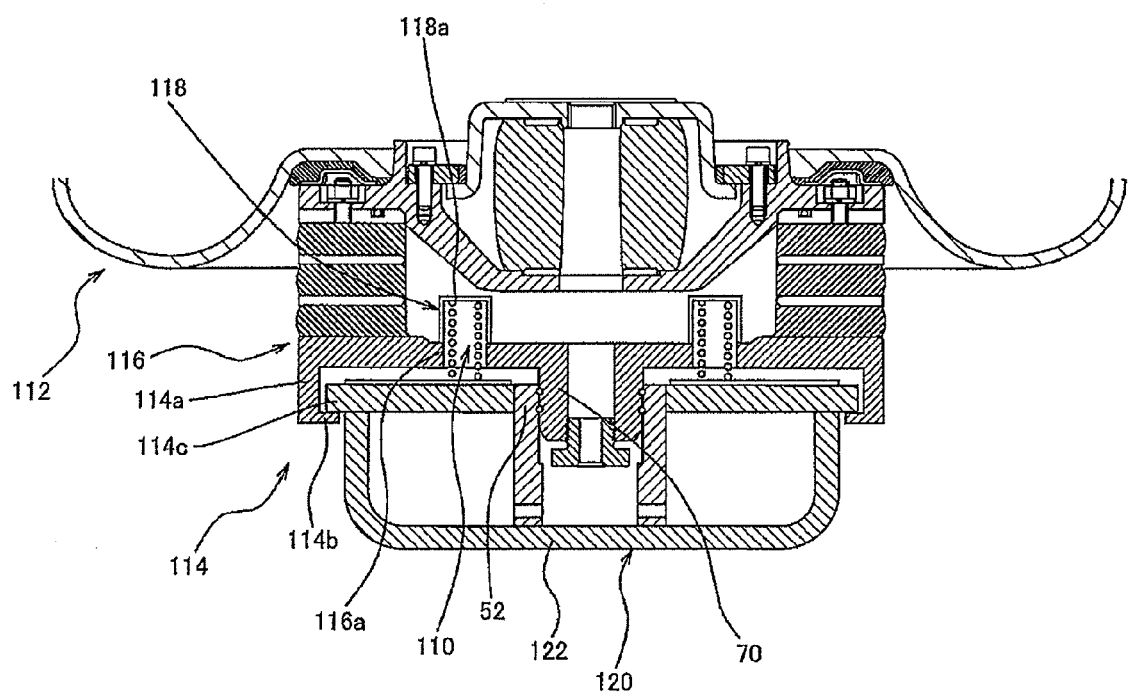
FIG. 13 is a cross-sectional view showing a state where the air spring is being pushed up by the coil spring (elastic member) in the railcar bogie according to the other embodiment.

As shown in FIG. 12, in the other embodiment, through holes 116a extending in the upper-lower direction are formed on a supporting portion 116 constituting an air spring 112, and substantially tubular accommodating portions 118 are provided on an upper surface of the supporting portion 116 to be respectively located around the through holes 116a. A lower end portion of each of the accommodating portions 118 is open through the through hole 116a toward a lower side of the air spring 112, and an upper end portion of the accommodating portion 118 is closed by a bottom portion 118a. Then, coil springs 110 each having an axis extending in the upper-lower direction are respectively accommodated in the accommodating portions 118 to be arranged between the air spring 112 and a bolster 120. An upper end portion of each of the coil springs 110 is attached to the bottom portion 118a, and a lower end portion of the coil spring 110 is attached to the bolster 120. The coil spring 110 receives the load of the carbody (not shown) via the air spring 112 to elastically deform. In a state (not shown) where the height of the carbody is maintained at a certain height, the load of the carbody applied to the coil spring 110 is reduced. Therefore, as shown in FIG. 13, the coil spring 110 pushes up the air spring 112 by its elastic force (that is, its restoring force).

As shown in FIG. 12, in the other embodiment, a limiting member 114 is provided to extend between the air spring 112 and the bolster 120 that serves as the "frame". To be specific, the limiting member 114 includes: a leg portion 114a extending downward from an outer peripheral portion of the supporting portion 116; a first stopper portion 114b extending from a lower end portion of the leg portion 114a toward the bolster 120 side; and a second stopper portion 114c formed to extend from an upper end portion of the bolster 120 in the horizontal direction. The first stopper portion 114b is arranged under the second stopper portion 114c so as to be opposed to the second stopper portion 114c in the upper-lower direction. In a state where the coil spring 110 receives the load of the carbody (not shown) to elastically deform (FIG. 12), the first stopper portion 114b and the second stopper portion 114c are separated from each other. In a state (not shown) the height of the carbody is maintained at a certain height, as shown in FIG. 13, the coil spring 110 pushes up the air spring 112, so that the air spring 112 and the bolster 120 are separated from each other, and the first stopper portion 114b is stopped by the second stopper portion 114c. At this time, the amount of separation between the air spring 112 and the bolster 120 is limit by the limiting member 114 to such a range that the fit state between the first connection portion 52 and the second connection portion 70 is maintained.

In the embodiment of FIG. 6, the limiting member 82 is attached to the coil spring 80 that serves as the "elastic member" and the bolster 20 that serves as the "frame". In the embodiment shown in FIG. 12, the limiting member 114 is provided to extend between the air spring 112 and the bolster 120 that serves as the "frame". However, the limiting member is not limited to these embodiments. For example, both the limiting member 82 (FIG. 6) and the limiting member 114 (FIG. 12) may be used concurrently.

The present invention is not limited to the above embodiments, and modifications, additions, or eliminations of the components of the above embodiments may be made within the scope of the present invention. The above embodiments may be combined arbitrarily. For example, a part of the components of one of the embodiments may be applied to the other embodiment.

REFERENCE SIGNS LIST 10 railcar bogie
14 carbody
20 bolster (frame)
22 air spring
42 frame main body
44 spring devices
46 seat portion
60 air spring main body
66 supporting portion
68 projecting portion
80 coil spring (elastic member)
82 limiting member

The invention claimed is:

1. A railcar bogie comprising:
a frame configured to be located under a carbody of a railcar;
an air spring including an air spring main body in which air is stored, the air spring being configured to be arranged between the carbody and the frame;
an elastic member arranged between the air spring and the frame and configured to separate the air spring from the frame by restoring force thereof in a state where a height of the carbody is maintained at a certain height regardless of the air spring; and
a limiting member configured to limit an amount of displacement of the elastic member to limit an amount of separation between the air spring and the frame, wherein
the elastic member is configured to provide the restoring force and to be displaced while providing the restoring force until the elastic member reaches a position where the limiting member limits the amount of displacement of the elastic member.

2. The railcar bogie according to claim 1, wherein the limiting member is provided at both sides of the elastic member regarding a displacement direction of the elastic member.

3. The railcar bogie according to claim 1, further comprising:
a first connection portion provided at the frame; and
a second connection portion provided on a lower surface of the air spring and configured to fit the first connection portion from above, wherein
the limiting member limits the amount of separation to such a range that a fit state between the first connection portion and the second connection portion is maintained.

4. The railcar bogie according to claim 3, wherein:
the frame includes an auxiliary air chamber in which the air is stored and a tubular communication portion configured to communicate with the auxiliary air chamber and constituting the first connection portion;
the air spring further includes
a communication pipe configured to communicate with the air spring main body and fit the communication portion and constituting the second connection portion, and
a sealing member attached to an outer peripheral surface of the communication pipe;
by inserting the second connection portion into the first connection portion, the auxiliary air chamber and the air spring main body communicate with each other through the communication portion and the communication pipe; and
in a case where the air spring and the frame are separated from each other, the sealing member is interposed between the communication pipe and the communication portion, which fit each other.

5. The railcar bogie according to claim 1, wherein:
the air spring further includes a supporting portion configured to receive elastic force of the elastic member to be separated from the frame and push up the air spring main body;
the frame includes a non-through hole that is located under the supporting portion and opens on an upper surface of the frame; and
the elastic member is arranged in the non-through hole.

6. The railcar bogie according to claim 1, wherein the limiting member is provided to extend between the frame and the air spring.

7. A railcar bogie comprising:
a frame configured to be located under a carbody of a railcar;
an air spring including an air spring main body in which air is stored, the air spring being configured to be arranged between the carbody and the frame;
an elastic member arranged between the air spring and the frame and configured to separate the air spring from the frame by restoring force thereof in a state where a height of the carbody is maintained at a certain height regardless of the air spring; and
a limiting member configured to limit an amount of displacement of the elastic member to limit an amount of separation between the air spring and the frame;
wherein:
the air spring further includes a supporting portion configured to receive elastic force of the elastic member to be separated from the frame and push up the air spring main body;
the frame includes a frame main body and a seat portion which extends from the frame main body in a horizontal direction and to which one of end portions of the elastic member is attached; and
the supporting portion includes a projecting portion which projects from the frame main body in a plan view, to which the other end portion of the elastic member is attached, and which receives the elastic force of the elastic member.

8. A railcar bogie comprising:
a frame configured to be located under a carbody of a railcar;
an air spring including an air spring main body in which air is stored, the air spring being configured to be arranged between the carbody and the frame;
an elastic member arranged between the air spring and the frame and configured to separate the air spring from the frame by restoring force thereof in a state where a height of the carbody is maintained at a certain height regardless of the air spring; and
a limiting member configured to limit an amount of displacement of the elastic member to limit an amount of separation between the air spring and the frame;
wherein:
the elastic member is a coil spring; and
the limiting member includes
a first restricting member attached to one of end portions of the coil spring regarding a displacement direction of the coil spring,
a second restricting member attached to the other end portion of the coil spring regarding the displacement direction of the coil spring and configured to move in the displacement direction of the coil spring by elastic deformation of the coil spring, and
a stopper member having one end portion fixed to the first restricting member, extending in the displacement direction of the coil spring, and having the other end portion that stops the second restricting member.

* * * * *